US006626064B1

United States Patent
Maue et al.

(10) Patent No.: US 6,626,064 B1
(45) Date of Patent: Sep. 30, 2003

(54) SINGLE MOTOR MODULE FOR A VEHICLE SEAT

(75) Inventors: H. Winston Maue, Northville, MI (US); Eric J. Krupp, Canton, MI (US); Michael N. Maass, Ypsilanti, MI (US); John R. Sims, Dearborn, MI (US); Samir Nayfeh, Somerville, MA (US); Justin W. Raade, Washburn, WI (US); Amy W. Cai, Minneapolis, MN (US); Jeehan S. Faiz, Dhaka (BD); Mario Montoya, San Antonio, TX (US); Erick Rios, Sabana Grande, PR (US); Pablo Tribin, Miami, FL (US); Ernesto Blanco, Belmont, MA (US)

(73) Assignee: Lear Corporation, Southfield, MI (US)

( * ) Notice: Subject to any disclaimer, the term of this patent is extended or adjusted under 35 U.S.C. 154(b) by 68 days.

(21) Appl. No.: 09/923,785

(22) Filed: Aug. 7, 2001

(Under 37 CFR 1.47)

Related U.S. Application Data (60) Provisional application No. 60/223,799, filed on Aug. 8, 2000.

(51) Int. Cl.[7] .............................. F16H 37/06; A47C 1/02
(52) U.S. Cl. .................................. 74/665 F; 297/344.13
(58) Field of Search ........................ 297/344.11, 344.12, 297/344.13, 344.14; 74/89, 89.28, 665 A, 665 B, 665 F, 665 GB, 655 GD (56) References Cited

U.S. PATENT DOCUMENTS

| | | | | |
|---|---|---|---|---|
| 4,141,583 A | * | 2/1979 | Kluting et al. | 296/344.13 X |
| 4,470,318 A | * | 9/1984 | Cremer et al. | 74/353 |
| 5,882,075 A | * | 3/1999 | Partington et al. | 74/665 GA X |
| 6,126,132 A | | 10/2000 | Maue | |

FOREIGN PATENT DOCUMENTS

DE     2914235     * 10/1979

OTHER PUBLICATIONS

Advertising Brochure of Means Industries, Inc. © 1998 entitled "A strong solution for power transmission".

* cited by examiner

*Primary Examiner*—Roger Pang
(74) *Attorney, Agent, or Firm*—Bill C. Panagos; MacMillan, Sobanski & Todd, LLC (57) ABSTRACT

A vehicle seat assembly includes a motor coupled to an output shaft. At least two driven shafts are each operable between three operating modes. The three operating modes are a stationary mode, a first rotational direction, and a second rotational direction. A transmission assembly connects the driven shafts to the output shaft. The transmission assembly is operable to control each of the driven shafts in any one of the three operating modes when the output shaft rotates in the first rotational direction.

12 Claims, 11 Drawing Sheets

SINGLE MOTOR MODULE FOR A VEHICLE SEAT

CROSS REFERENCE TO RELATED APPLICATIONS

This application claims the benefit of U.S. Provisional Application No. 60/223,799 filed Aug. 8, 2000.

BACKGROUND OF THE INVENTION

This invention relates in general to vehicle seats, and in particular to a power seat adjuster using a single motor and a transmission assembly to move the seat in 6 separate axes.

Most passenger vehicles include seats, such as driver and passenger seats, which are adjustably mounted on the floor of the vehicle. It is becoming increasingly common to provide power actuated seat adjusters for adjusting the seat position relative to the vehicle floor. A typical power seat adjuster can be operated to adjust the seat in a fore and aft direction and a generally vertical or elevational direction. Generally, power seat adjusters control the elevation of the front and rear portions of the seat bottom separately. Thus, the typical power seat adjuster can be operated to adjust the seat in generally three axes: 1) fore and aft; 2) front elevation; and 3) rear elevation.

The fore and aft axis corresponds to the generally horizontal longitudinal direction relative to the vehicle, and generally moves the seat closer or farther away from the steering wheel and operating pedals of the vehicle. To allow fore and aft adjustment, vehicle seats typically include track mechanisms having a pair of sliding tracks which permit sliding movement of the seat relative to the vehicle floor. An upper track member is attached to the seat bottom, and a lower track member is mounted on the vehicle floor. A power mechanism driven by an electric motor moves the upper track member relative to the lower track member, thereby moving the seat bottom in the fore or aft direction.

The mechanisms which control the elevation typically include an electric motor and a crank or sector gear for upwardly or downwardly moving the seat bottom. Although the function of the mechanism is to move the seat portions in a vertical direction or axis, some mechanisms move the seat portions in an arcuate path corresponding to a rotating member. Typically, there is an electric motor and gear mechanism for each of the front and rear elevational controls. Thus, conventional power seat adjusters typically include three separate electric motors for controlling the three seat axes. Although the use of three separate motors has been found effective in controlling the position of the seat, the cost of the motors is relatively expensive and increases the weight of the seat.

SUMMARY OF THE INVENTION

This invention relates to a powered seat adjuster for a vehicle seat. The vehicle seat assembly includes a motor coupled to an output shaft. At least two driven shafts are each operable between three operating modes. The three operating modes are a stationary mode, a first rotational direction, and a second rotational direction. A transmission assembly connects the driven shafts to the output shaft. The transmission assembly is operable to control each of the driven shafts in any one of the three operating modes when the output shaft rotates in the first rotational direction.

Various objects and advantages of this invention will become apparent to those skilled in the art from the following detailed description of the preferred embodiment, when read in light of the accompanying drawings.

DETAILED DESCRIPTION OF THE INVENTION

Figure 1:
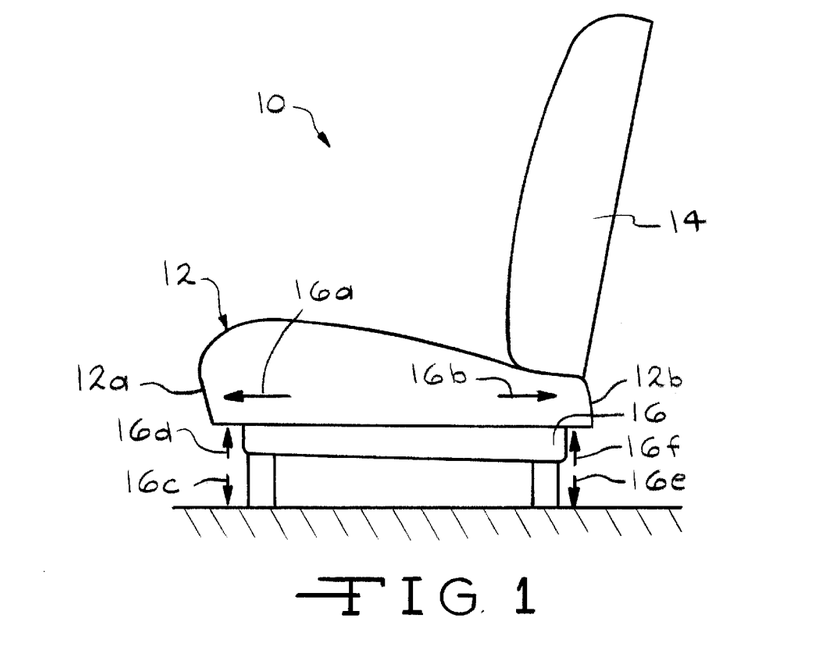
FIG. 1 is a schematic representation of a vehicle seat movable by a power seat adjuster, in accordance with the present invention.

There is illustrated in FIG. 1 a schematic drawing of a vehicle seat 10. The seat 10 generally includes a seat bottom 12 and seat back 14. The seat 10 further includes a powered seat adjuster 16 preferably connected to the seat bottom 12. The seat adjuster 16 can be actuated to move the seat bottom 12 in various positions preferably along three seat axis. The three preferred seat axis are: 1) fore and aft; 2) front elevation; and 3) rear elevation. The seat adjuster 16 can be configured to move the seat bottom 12 in a fore and aft generally horizontal direction as indicated by the directional arrows 16a and 16b. Additionally, the seat adjuster 16 can be configured to move the seat bottom 12 in a generally vertical or elevational direction. Preferably, the seat adjuster 16 can independently move a front portion 12a of the seat bottom 12 relative to a rear portion 12b of the seat bottom 12. Thus, the seat adjuster 16 preferably is operable to move the front portion 12a in generally downwardly and upwardly directions as indicated by directional arrows 16c and 16d. The seat adjuster 16 is also preferably operable to move the rear portion 12b in generally downwardly and upwardly directions as indicated by directional arrows 16e and 16f. Of course, the seat adjuster 16 can be configured to move the seat bottom 12 or seat back 14 (such as reclining movement) by any suitable manner. As will be described below, the seat adjuster 16 includes a motor assembly 30 which preferably uses a single motor 32 and multiple transmissions to move the seat bottom 12 into various positions, in accordance with the present invention.

Figure 2:
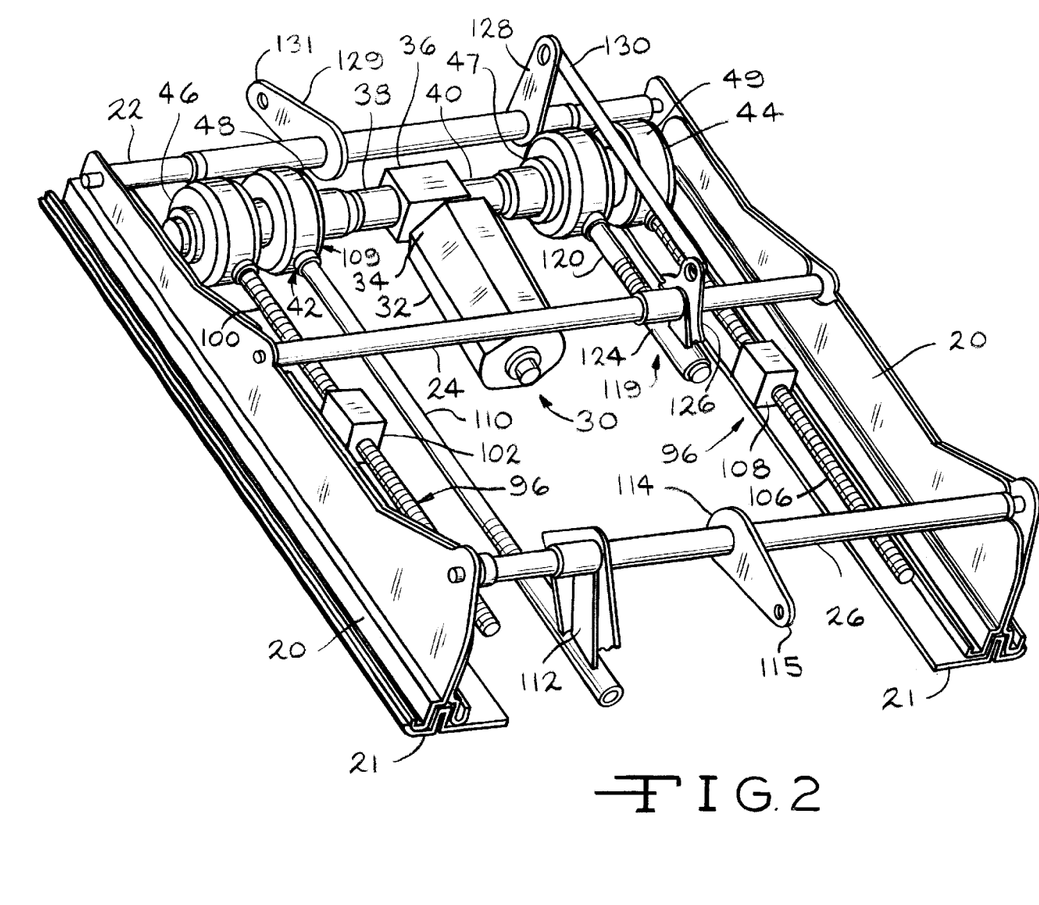
FIG. 2 is a perspective view of the seat adjuster.

There is illustrated in FIG. 2 an embodiment of a seat adjuster 16. The seat adjuster 16 includes three seat mechanisms, each corresponding to the three seat axis: 1) fore and aft; 2) front elevation; and 3) rear elevation. Each of the three axis generally has three possible movements. The three possible movements are: 1) stationary; 2) first directional movement; and 3) second directional movement. For example, the axis associated with the front elevation can move the seat in the upward direction 16d, the downward direction 16c, or maintain a stationary position. The three axis and three possible movements of each axis results in twenty seven possible seat axis combinations or modes. As will be discussed in detail below, the motor assembly 30 of the seat adjuster 16 uses a single motor 32 and multiple transmissions to move the seat bottom 12 in the twenty seven possible seat axis combinations.

As shown in FIG. 2, the seat adjuster 16 includes a pair of parallel spaced upper tracks 20. The upper tracks 20 engage with and slide relative to lower tracks 21 to provide fore and aft directional movement 16a and 16b of the seat. The lower tracks 21 are mounted relative to the floor of the vehicle in which the seat 10 is installed. The upper tracks 20 are preferably connected by three rods 22, 24, and 26. The ends of the rods 22, 24, and 26 are preferably rotatably mounted on the upper tracks 20.

The seat adjuster 16 further includes a motor assembly, indicated generally at 30. The motor assembly 30 includes an electric motor 32 which drives an output shaft 34 connected to a gear box 36. The motor 32 is preferably a reversible drive motor in that it is operable to rotate the output shaft 34 in either of the rotational directions. A pair of driven shafts 38 and 40 are connected to the gear box 36. The gear box 36 rotatably couples the output shaft 34 to both the driven shafts 38 and 40. The rotatable coupling of the shafts 34, 38, and 40 can be a one-to-one ration or any other suitable relationship.

The seat adjuster 16 further includes a pair of transmission assemblies 42 and 44 which are connected to the driven shafts 38 and 40, respectively. The transmission assembly 42 generally houses a pair of transmissions 46 and 48. In a similar manner, the transmission assembly 44 houses a pair of transmissions 47 and 49 (hidden in FIG. 2). The transmission assemblies 42 and 44 can be configured to include a single transmission or any multiple number of transmissions. As will be discussed in further detail below, the transmissions 46 and 49 generally control the fore and aft position of the seat bottom 12, the transmission 47 controls the elevation of the front portion 12a of the seat bottom 12, and the transmission 49 controls the elevation of the rear portion 12b of the seat bottom 12.

Figure 3:
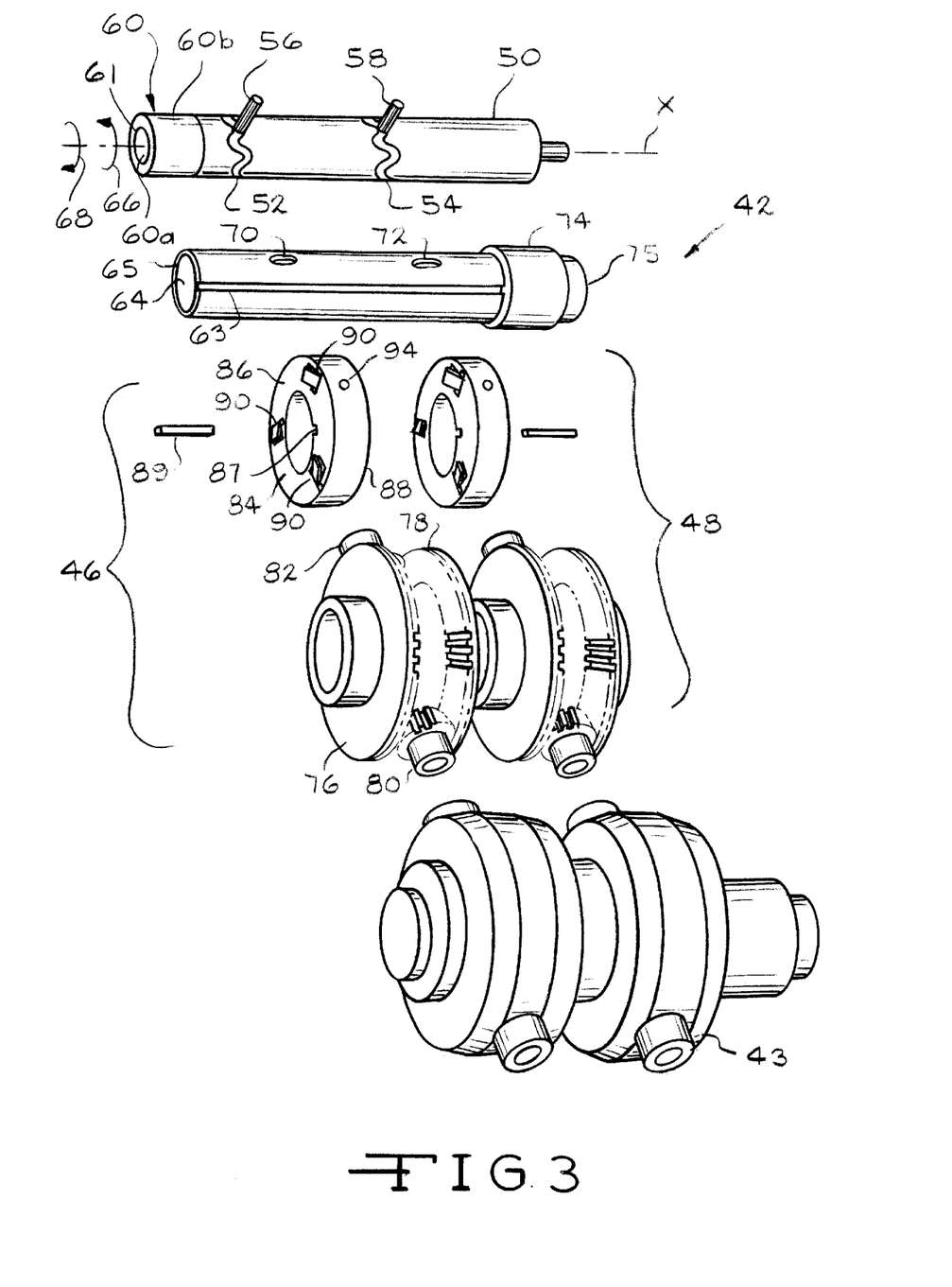
FIG. 3 is an exploded perspective of a transmission assembly of the seat adjuster of FIG. 2.

The transmission assemblies 42 and 44 are similar in function and structure, and therefore, only the transmission assembly 42 will be described in detail, as shown exploded in FIG. 3. Referring to FIGS. 3 through 7, the transmission assembly 42 includes a housing 43 which covers the transmissions 46 and 48. The housing 43 can be made of any suitable material and can be composed of two separate parts joined together. The housing 43 is generally fixed and does not rotate. The housing 43 can be mounted on one of the upper tracks 20.

As shown in FIG. 3, the transmission assembly 42 further includes an inner shaft 50 rotatably connected to the driven shaft 38 from the gear box 36, such as for example by a flex cable/shaft arrangement (not shown). If desired, the shaft 50 and the driven shaft 38 can be integrally formed together. The inner shaft 50 includes a pair of circumferential grooves 52 and 54 formed therein. Preferably, the grooves 52 and 54 are formed completely around the shaft 50 and have a serpentine-like shaped profile that varies with respect to the longitudinal axis X of the shaft 50, the reason for which will be explained below. Pins 56 and 58 are slidably disposed in the grooves 52 and 54 and are adapted to ride therein as the shaft 50 rotates. A one-way bearing 60 is mounted on an end 61 of the inner shaft 50. The bearing 60 has an inner cylindrical surface 60a which selectively rotates relative to an outer cylindrical surface 60b. The inner cylindrical surface 60a is rotationally fixed relative to the end 61 of the inner shaft 50. Any suitable one-way bearing structure can be used for the bearing 60.

Figure 6:
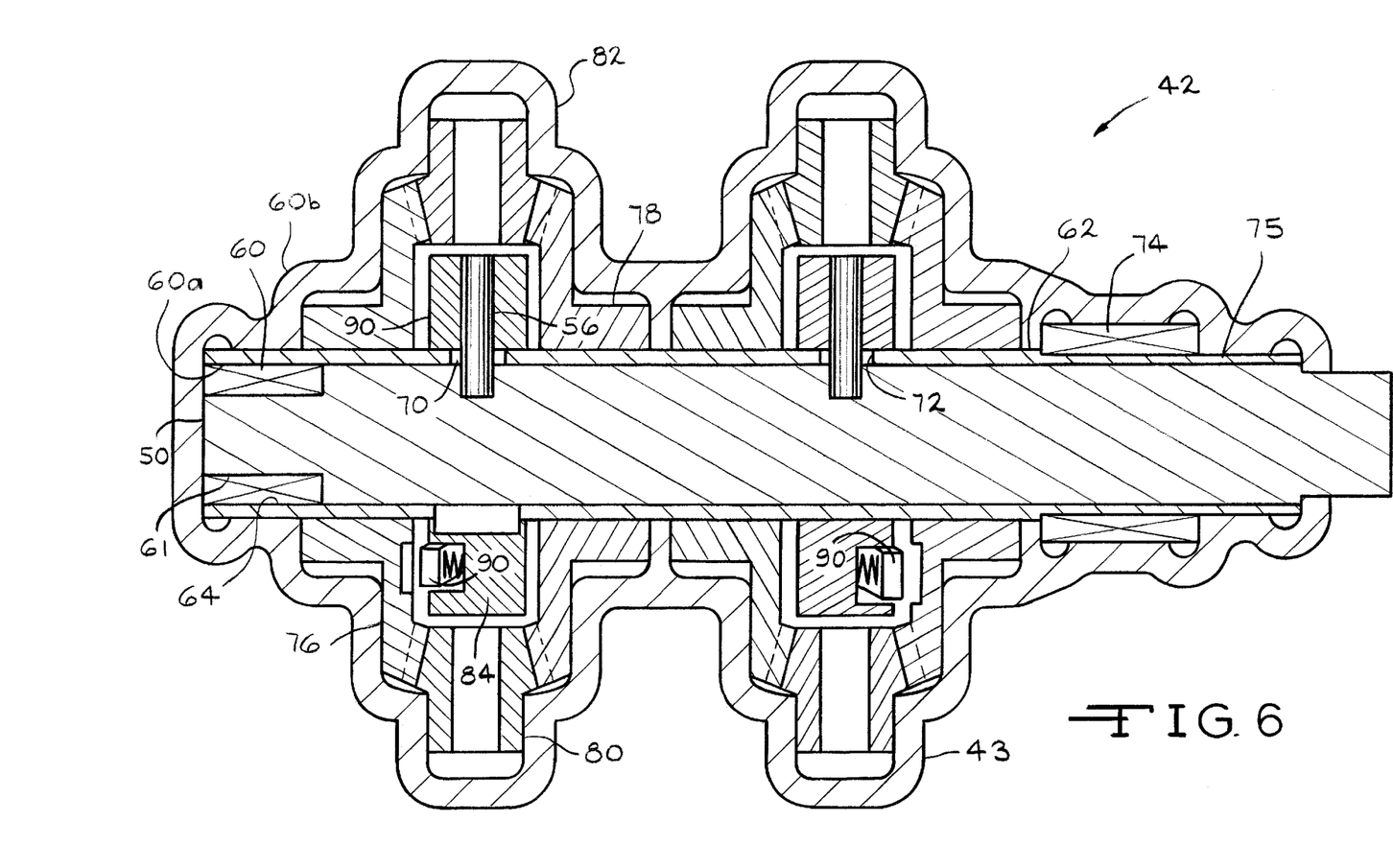
FIG. 6 is a sectional view of the transmission assembly of FIG. 3.
Figure 7:
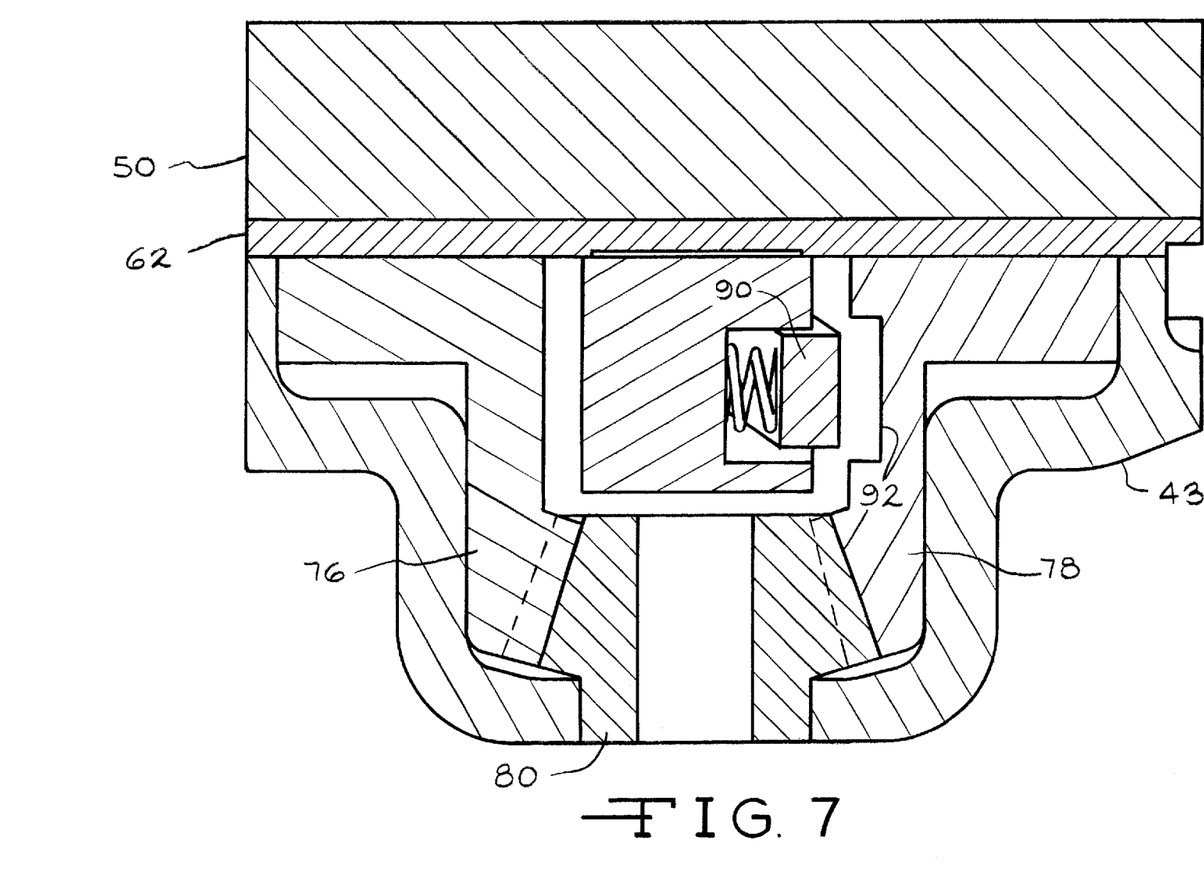
FIG. 7 is an enlarged portion of the transmission assembly of FIG. 5.

The inner shaft 50 is coaxially disposed in a tubular shaped outer shaft 62. The outer shaft 62 preferably includes a keyway or slot 63 extending axially along the length of the outer shaft, the reason for which will be explained below. The outer surface 60b of the one-way bearing 60 is fixed relative to an inner surface 64 of an end 65 of the outer shaft 62. The one-way bearing 60 preferably permits rotation of the inner shaft 50 relative to the outer shaft 62 when rotated in a first rotational direction, as indicated by the rotational direction arrows 66 in FIG. 3, about the axis X of the inner shaft 50. The one-way bearing 60 preferably couples the inner shaft 50 and outer shaft 62 together when the inner shaft 50 is rotated in the opposite second rotational direction, as indicated by the directional arrows 68 in FIG. 3, about the axis X of the inner shaft 50. Thus, upon rotation of the inner shaft 50 in the second rotational direction 68, the inner and outer shafts 50 and 62 rotate together. The outer shaft 62 includes a pair of slots 70 and 72 through which the pins 56 and 58 extend, respectively. Preferably, the slots 70 and 72 are elongated in the axial direction, as best shown in FIGS. 3 and 6, so that the corresponding pins 56 and 58 can move slightly in an axial direction relative to the outer shaft 62. An optional one-way bearing 74 can be mounted on an end 75 of the outer shaft 62. The bearing 74 has an inner cylindrical surface 74a which selectively rotates is relative to an outer cylindrical surface 74b. The inner cylindrical surface 74a is rotationally fixed relative to the end 75 of the outer shaft 62. The outer cylindrical surface 74b is rotationally fixed relative to an inner cylindrical surface 77 formed in the housing 43. The one-way bearing 74 is oriented in the opposite rotational direction of the one-way bearing 60 to prevent the outer shaft 62 from rotating when the inner shaft 50 rotates in the first rotational direction 66, but permitting the outer shaft 62 to rotate with the inner shaft 50 when rotated in the second directional direction 68.

The transmission 46 is similar in design to the transmissions 47, 48, and 49, and therefore, only the transmission 46 will be described in detail. The transmission 46 includes a pair of coaxially aligned bevel gears 76 and 78 and a pair of coaxially aligned pinion gears 80 and 82. The bevel gears 76 and 78 are intermeshed with the pinion gears 80 and 82 by beveled gear teeth 76a, 78a, 80a, and 82a formed on the gears 76, 78, 80, and 82, respectively. The gears 76, 78, 80, and 82 are mounted for rotation within the housing 43. As shown, the gears 76, 78, 80, and 82 are beveled in a 90 degree rotational relationship. The gears 76, 78, 80, and 82 are intermeshed such that rotation of one of the gears rotates all of the gears. The bevel gears 76 and 78 and the pinion gears 80 and 82 can have any suitable gear ratio.

Disposed between the bevel gears 76 and 78 is a clutch 84. The clutch 84 has a tubular shape including a cylindrical inner surface 85. The inner surface 85 has an axially extending keyway or slot 87 formed therein for receiving a key 89. The key 89 also mates with the slot 63 formed in the outer shaft 62. The key 89 and slots 63 and 87 provide rotational coupling of the outer shaft 62 and the clutch 84 while permitting axial movement of the clutch along the length of the outer shaft 62.

Figure 4:
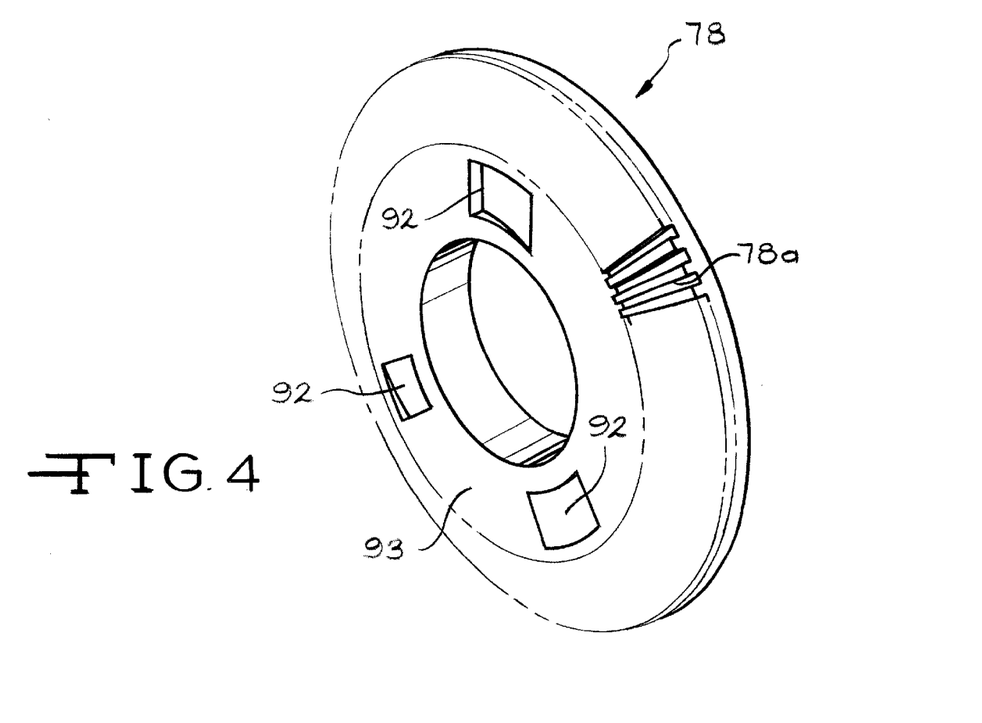
FIG. 4 is a perspective view of bevel gear used in the transmission assembly of FIG. 3.
Figure 5:
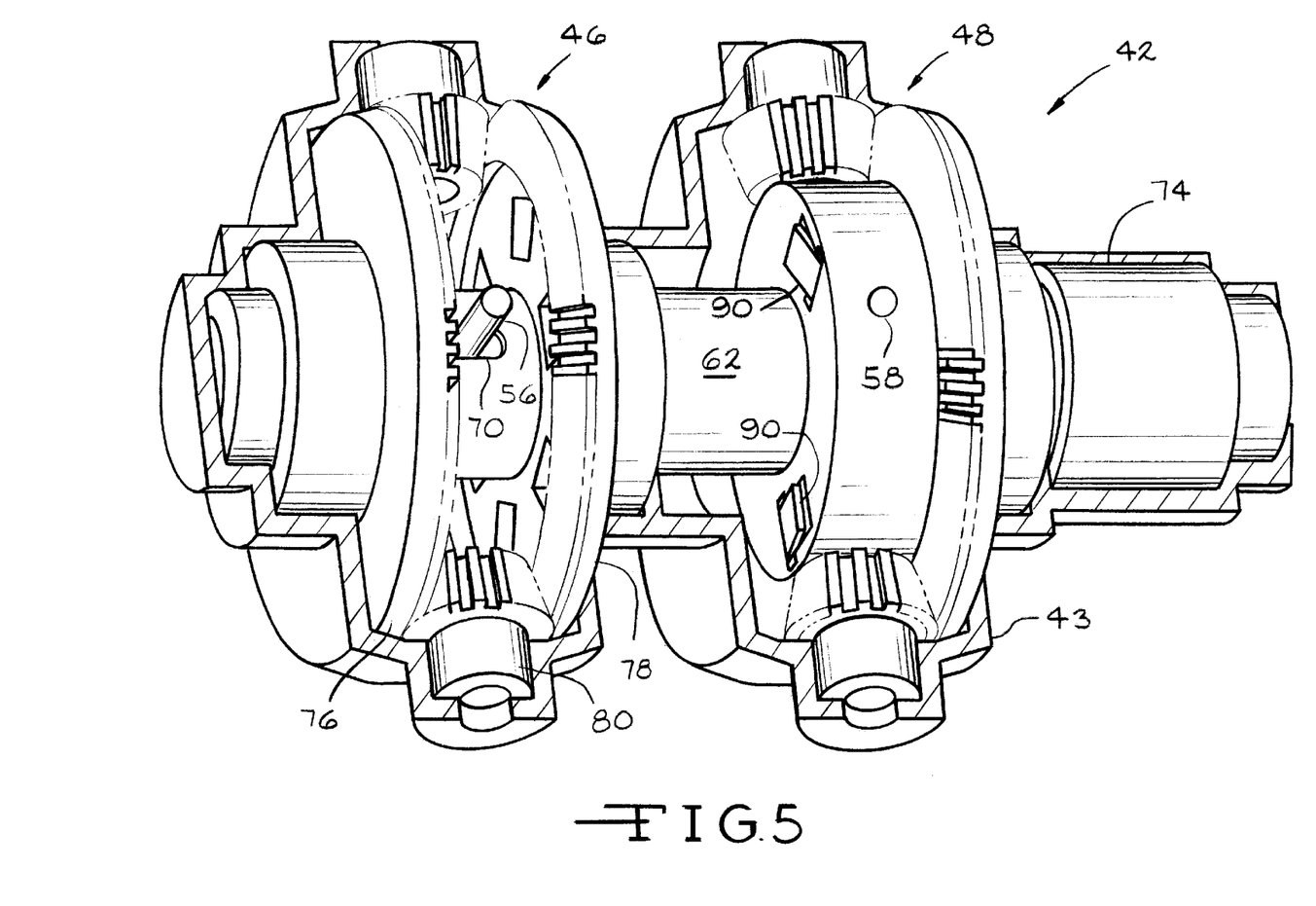
FIG. 5 is a partial sectional perspective view of the transmission assembly of FIG. 3, with one of the clutches removed for clarity.

The clutch 84 includes two outer opposed surfaces 86 and 88. The surfaces are generally flat and circular in shape and are generally perpendicular to the axis of rotation of the clutch 84. Each of the surfaces 86 and 88 preferably includes a plurality of ramped members 90 which extend axially outwardly from the surfaces 86 and 88 in a ramp-like manner. The clutch can have any suitable number of ramped members 90. Preferably, the ramped members 90 are spring loaded so that they are biased to an outward position but can be moved to a flush position relative to the surfaces 86 and 88. The ramped members 90 selectively engage with corresponding wedge-shaped recesses 92, as best shown in FIG. 4, formed in outer surfaces 93 of the bevel gears 76 and 78 when the surfaces 86 and 88 are sufficiently close to the bevel gears 76 and 78. The clutch 84 can be slightly spaced from the bevel gears 76 and 78 such that the clutch 84 is positioned between the bevel gears 76 and 78 so as to prevent engagement with either one. The clutch 84 includes a radially extending bore 94 which receives the pin 56. The outer surfaces 93 of the bevel gears function as clutch plates spaced apart from one another and selectively engageable with a clutch 84 or clutch member disposed therebetween for rotational movement therewith.

As will be described below, rotation of the axial movement of the pin 56 moves the clutch 84 in an axial direction along the length of the outer shaft 62 to position the clutch 84 relative to the bevel gears 76 and 78 for selective engagement therewith. The pin 56 is moved by riding in the slot 52 formed in the shaft 50. As will be explained below, the pins are movable between generally three positions within their respective slots formed in the inner shaft. Thus, the clutches are movable in generally three positions. The first position corresponds to a stationary position in which the clutch does not engage either of the bevel gears. The second position corresponds to the clutch being engaged with one of the bevel gears, and the third position corresponds to the clutch being engaged with the other of the bevel gears. The pinion gears 80 and 82 function as output shafts for the transmission 46.

It should be understood that the illustrated clutch 84 is only an example of a suitable clutch, and that any suitable clutch mechanism can be used to selectively engage the bevel gears 76 and 78 to practice the invention. Alternatively, the location of the ramped members 90 and recesses 92 could be reversed such that the bevel gears include the ramped members 90 and the clutch 84 has the recesses 92 formed therein.

Referring again to FIG. 2, the seat adjuster 16 includes a first seat mechanism, indicated generally at 96, for controlling the fore and aft position of the seat bottom 12. The seat mechanism 96 is connected to the transmissions 46 and 49 for controlling the fore and aft seat axis or directional movements 16a and 16b. The seat mechanism 96 includes a threaded rod 100. The pinion gear 80 of the transmission 46 is coupled to the threaded rod 100 for rotational movement therewith. The threaded rod 100 is threadably engaged with a threaded bore of a drive block 102. The drive block 102 is preferably operatively mounted on the lower track 21 of the seat adjuster 16 or floor of the vehicle. Rotation of the pinion gear 80 rotates the threaded rod 100 causing translation of the drive block 102, which causes fore or aft movement of the seat bottom 12. Although the seat adjuster 16 can function with a single first seat mechanism 96, the seat adjuster 16 preferably includes a pair of synchronized seat mechanisms for controlling the fore and aft position of each track assembly. For example, as shown in FIG. 2, the seat adjuster includes a threaded rod 106 and drive block 108 connected to the transmission 49 in a similar manner as the connection between the threaded rod 100, block 102, and transmission 46. Thus, the transmissions 46 and 49 should be synchronized with each other.

The seat adjuster 16 includes a second seat mechanism, indicated generally at 109, for controlling the elevational position or directions 16e and 16f of the rear portion 12b of the seat bottom 12. The transmission 48 generally controls the rear elevational seat axis. The second seat mechanism includes a rod 110 connected to the pinion gear 80 of the transmission 48. The rod 110 is rotationally coupled to a gear assembly 112, such as a worm and spur gear arrangement, which is rotationally coupled to the rotatable rod 26 connecting the upper tracks 20 together. Thus, rotational movement of the rod 110 rotates the rod 26. A link 114 is connected to the rod 26 and extends radially outwardly therefrom. The link 114 has an end 115 which is pivotally connected to a portion (not shown) of the rear portion 12b of the seat bottom 12. The end 115 of the link 114 moves in an arcuate path to provide the elevational movement of the rear portion 12b of the seat bottom 12.

The seat adjuster 16 also includes a third seat mechanism, indicated generally at 119, for controlling the elevational position or directions 16c and 16d of the front portion 12a of the seat bottom 12. The transmission 47 generally controls the front elevation seat axis. The third seat mechanism 119 includes a rod 120 connected to an output pinion gear (not shown) of the transmission 47. The rod 120 is rotationally coupled to a gear assembly 124, such as a worm and spur gear arrangement, which is rotationally coupled to the rod 24. A pair of links 126 and 128 and a connecting rod 130 rotationally couple the rod 24 to the rod 22. A link 129 is connected to the rod 22 and extends radially outwardly therefrom. The link 129 has an end 131 which is pivotally connected to a portion (not shown) of the front portion 12a of the seat bottom 12. The end 131 of the link 129 moves in an arcuate path to provide the elevational movement of the front portion 12a of the seat bottom 12.

It should be understood that the seat mechanisms 96, 109, and 119 can be any suitable device which is capable of moving the seat bottom between the three seat axes in the directions 16a, 16b, 16c, 16d, 16e, and 16f or any combination thereof.

The operation of the transmissions 46, 47, 48, and 49 will now be discussed. Since the transmissions 46, 47, 48, and 49 are similar in structure to each other, only the operation of the transmission 46 will described in detail. As stated before, three axis and three possible movements of each axis results in twenty seven possible seat axis combinations or modes. The slots 52 and 54 formed in the inner shaft 50 of the transmission assembly 42, and the slots formed in the inner shaft of the transmission assembly 44 are each formed with a specific profile which cooperate to move the respective clutches into the twenty seven possible seat axis combination. Preferably, the profiles of the slots are divided into twenty seven angular positions encircling the entire circumference of the inner shaft. Thus, each angular position is preferably approximately 13.3 (360 degrees/27) degrees away from an adjacent angular position. Each angular position of the slot is offset axially relative to the inner shaft by one of three axial positions. Thus, the pin, and therefore the corresponding clutch, is movable between three axial positions relative to the inner shaft. Each angular position corresponds to one of the three positions of the clutches: 1) stationary—such that the clutch is between the bevel gears and there is no contact therebetween; 2) first directional movement such that the clutch is engaged with one of the bevel gears to drive the bevel gear and pinions in one corresponding rotational direction; and 3) second directional movement such that the clutch is engaged with the other of the bevel gears to drive the bevel gear and pinions in the opposite rotational direction.

Although the illustrated embodiment of the seat adjuster 16 uses three seat mechanisms for a total of 27 profiles or seat axis combinations, it should be understood that the seat adjuster 16 can be used with less or more seat mechanisms. For example, the seat adjuster 16 can be used with two seat mechanisms such that there are nine possible combinations.

Figure 8:
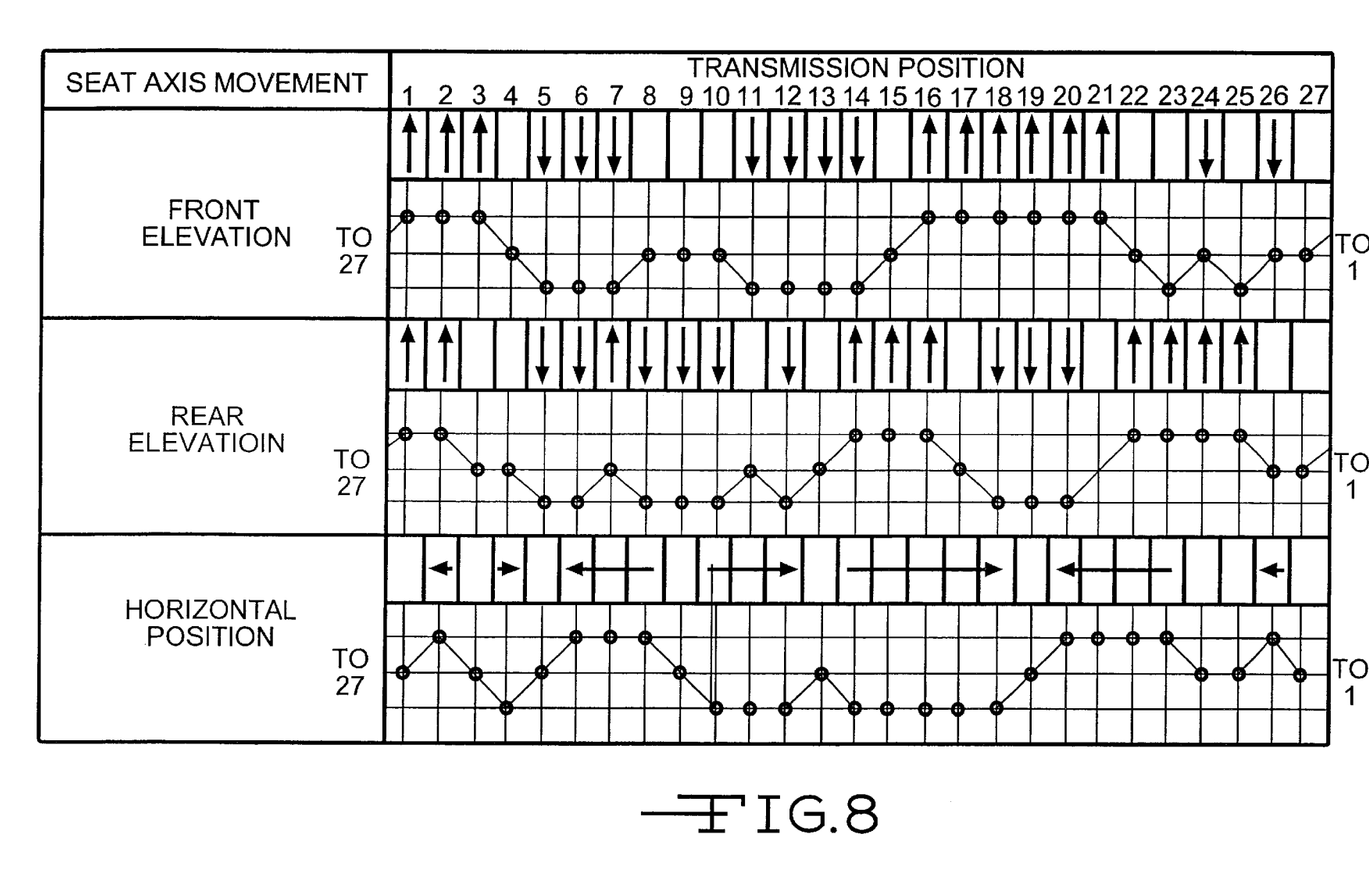
FIG. 8 is a schematic representation of a slot profile for transmission positions.

There is illustrated in FIG. 8 an example of three profiles which can be used for the circumferential slots 52, 54, of the inner shaft 50 and the slots corresponding to the inner shaft of the transmission assemblies. The profiles correspond to the desired axial position of the pins relative to the corresponding inner shaft. As shown relative to the front elevation profile in FIG. 8, the positions labeled A, B, and C correspond to the axial position of the pins. A blank space under the Transmission Position generally represents the stationary position of the clutch wherein the clutch is located between the bevel gears and there is no contact therebetween. Thus, a blank space represents no movement of the seat mechanism. The arrows under the Transmission Position generally represents movement directions 16a, 16b, 16c, 16d, 16e, or 16f of the seat bottom. The direction of the arrow represents the one of two rotational directions of the pinion gears which drive the seat mechanisms.

For example, if an occupant of the seat 12 wishes to move the seat bottom in an aft direction 16b, move the front portion 12a in a lowered direction 16c, and raised the rear portion 12b in an upward direction 16f simultaneously, the occupant would select a control switch for that desired position. A microcontroller or microprocessor 131, as will be discussed in detail below, controls the seat adjuster 16 according to the Transmission Position 14 of FIG. 8. To accomplish this movement, the motor 32 is engaged in a first rotational direction, herein referred to as the gear selection rotational direction. The rotation of the motor 32 causes rotation of the inner shafts in the first rotational direction 66 for the inner shaft 50 of the transmission 46. The motor is engaged until the pins of all of the transmissions are aligned in the slots at their respective $14^{th}$ position. Rotation of the inner shafts causes the pin to move within the slot profile to its corresponding axial position. Movement of the pins cause the corresponding clutches to move into one of their three positions (stationary, first directional movement, and second directional movement, as described above). Note that when the motor is engaged in its first rotational direction, the outer shafts do not rotate due to the one-way bearings.

Figure 9:
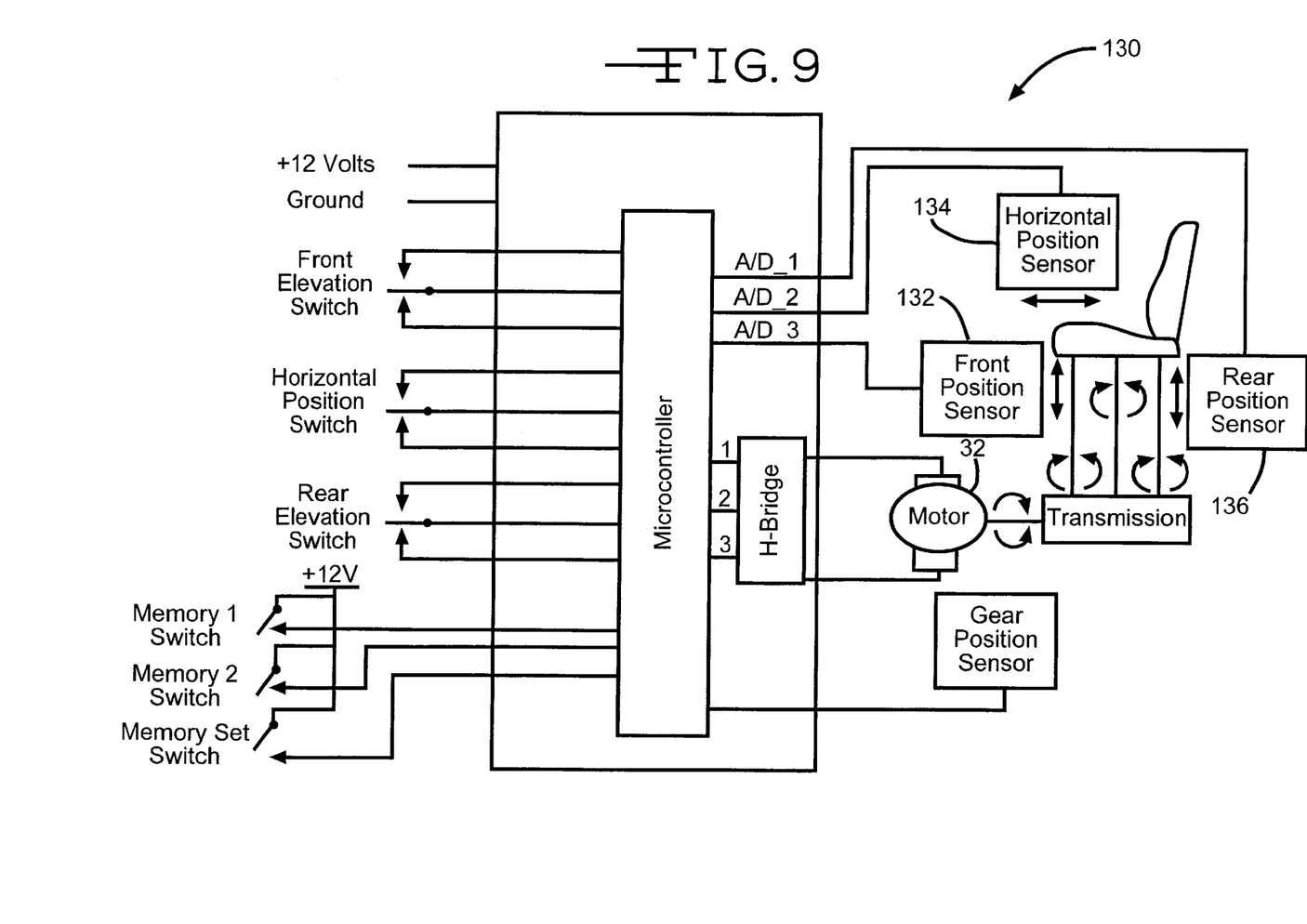
FIG. 9 is a schematic of an electrical circuit for controlling a motor assembly of the seat adjuster.

Preferably, the gear box 36 has a 27 to 1 gear ratio such that one revolution of the output shaft 34 of the motor 32 causes a 1/27 revolution of the output shafts 38 and 40 from the gear box 36. A gear position sensor 142, as shown in FIG. 9, is preferably used to detect the position of the inner shafts of the transmission assemblies. For example, the sensor 137 can be used to detect the number of revolutions of the output shaft 34 of the motor 32 to determine the transmission positions corresponding to the profile position.

Once the clutches are moved to their positions corresponding to the $14^{th}$ transmission position, the motor 32 is stopped or braked. The motor 32 is then engaged in the opposite rotational direction causing rotation of both the inner shafts and outer shafts of the transmissions. For example, for the transmission assembly 42, the inner shaft 50 and outer shaft 62 will rotate simultaneously in the rotational direction 68. Rotation of the outer shaft 62 causes rotation of the clutches due to the coupling between the key 89 and slots 63 and 87. Rotation of the clutches causes rotation of the bevel gears if the clutch is engaged therewith. Rotation of the bevel gears causes rotation of the pinion gears which are connected to the seat mechanisms. Thus, for the $14^{th}$ position, the transmissions 46 and 49 will drive the threaded rods 100 (and 106) to move the seat in the aft direction. The transmission 48 will drive the rod 110 to move the rear portion 12b of the seat bottom 12 to upward. The transmission 47 will drive the rods 120, 22 and 24 to move the front a portion 12a of the seat bottom 12 downward.

It should be understood that any suitable transmission profile can be used. However, it is preferred that positions corresponding to a first directional movement is not adjacent a position corresponding to a second directional movement so that is the angle of the profile is not severe. Thus, a position corresponding to the stationary or non-movement should be placed between the first and second directional movement positions.

There is illustrated in FIG. 9 a schematic of a preferred electrical circuit 130 for controlling the seat adjuster 16. The circuit includes a microprocessor 132 for controlling the motor 32. The circuit 130 includes three control switches 134, 136, and 138 which the user of the seat operates to control the seat adjuster 16. The switch 134 corresponds to the elevation of the front portion 12a of the seat bottom 12 in the directions 16c and 16d. The switch 136 corresponds to the elevation of the rear portion 12b of the seat bottom 12 in the directions 16e and 16f. The switch 138 corresponds to the fore and aft position of the seat bottom 12 in the directions 16a and 16b. The switches 134, 136, and 138 can be any suitable switch mechanisms which are operable to send a signal to the microprocessor 132 indicating which direction (or stationary) the seat bottom is to be moved. For example, the switches can be simple three position switches mounted on the seat or elsewhere in the vehicle. Preferably, the circuit 130 includes one or more memory switches 140 for moving the seat adjuster 16 to a selected position preferably programmable by the user. The user can program the memory position by moving the seat adjuster to the desired portion via the switches 134, 136, and 138 and then actuating a memory set switch 141 and corresponding memory switch 140.

As stated above, the circuit 130 preferably includes the gear position sensor 142 used to detect the position of the inner shafts of the transmission assemblies. For example, the sensor 142 can be used to detect the number of revolutions of the output shaft 34 of the motor 32 to determine the transmission positions corresponding to the profile position. For hysteresis reasons, it may be desirable to provide sensors 144, 146, and 148, such as Hall effect or potentiometers, to provide sensory input for controlling the motor assembly 30. The sensor 144 detects the position of the front portion 12a of the seat bottom 12. The sensor 146 detects the fore and aft position of the seat bottom 12. The sensor 148 detects the position of the rear portion 12b of the seat bottom 12. The sensors 144, 146, and 148 are electrically connected to the microprocessor 132 to aid in the control of the motor 32.

Preferably, when the motor 32 is engaged in its gear selection rotation to move the inner shafts and pins to their respective positions, for example, in the rotational direction 66 for the inner shaft 50, the motor is run at a slower rate than when engaged in the opposite direction to move the seat by driving the outer shafts and pinion gears. To accomplish this, the circuit 130 can include a control circuit 150, also illustrated in FIG. 10, which is referred to as a pulse width modulated H-Bridge. The control circuit 150 is generally connected between the microprocessor 132 and the motor 32. The control circuit 150 is electrically connected to the microprocessor 132 by three Inputs 150a, 150b, and 150c. The control circuit 150 is electrically connected to the motor by paths 32a and 32b.

Figure 10:
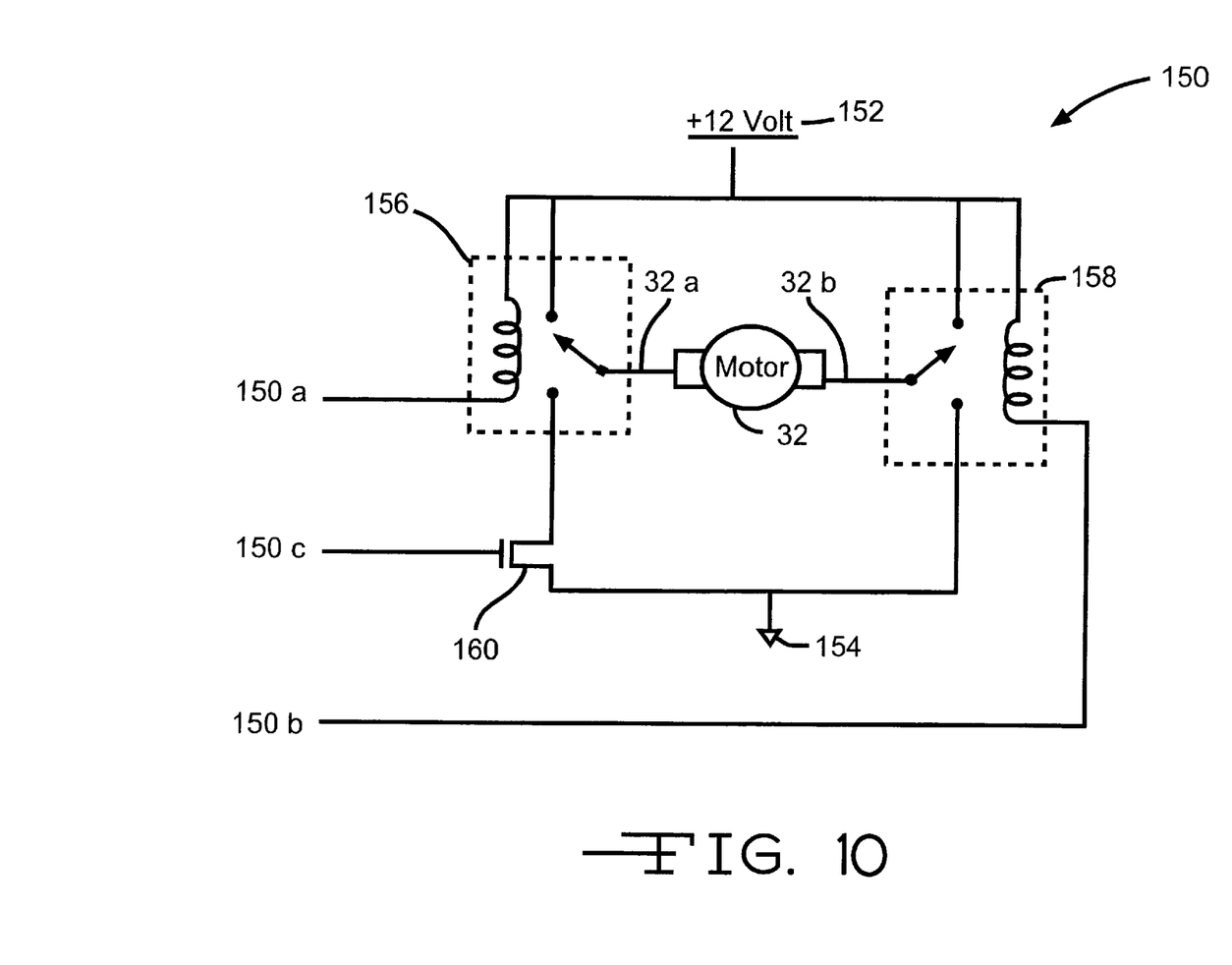
FIG. 10 is a schematic of a control circuit used in the electrical circuit of FIG. 9.

The control circuit 150 is electrically connected to a power supply 152, such as the vehicle 12 or 42 volt power system, and a ground 154. A relay 156 is generally connected between the motor 32 and the Input 150a. A relay 158 is generally connected between the motor 32 and the Input 150b. The control circuit 150 preferably includes a switching device or Field Effect Transistor (FET) 160 to provide a means for reducing the speed of the motor in one of the rotational directions using pulse width modulation. The FET transistor 160 is generally connected between the relays 156 and 158. To brake or prevent rotation of the motor 32, none of the Inputs 150a, 150b, and 150c are energized from the microprocessor 132. The FET transistor preferably modulates the voltage applied to the motor 32 to control the speed of the motor 32.

Figure 11:
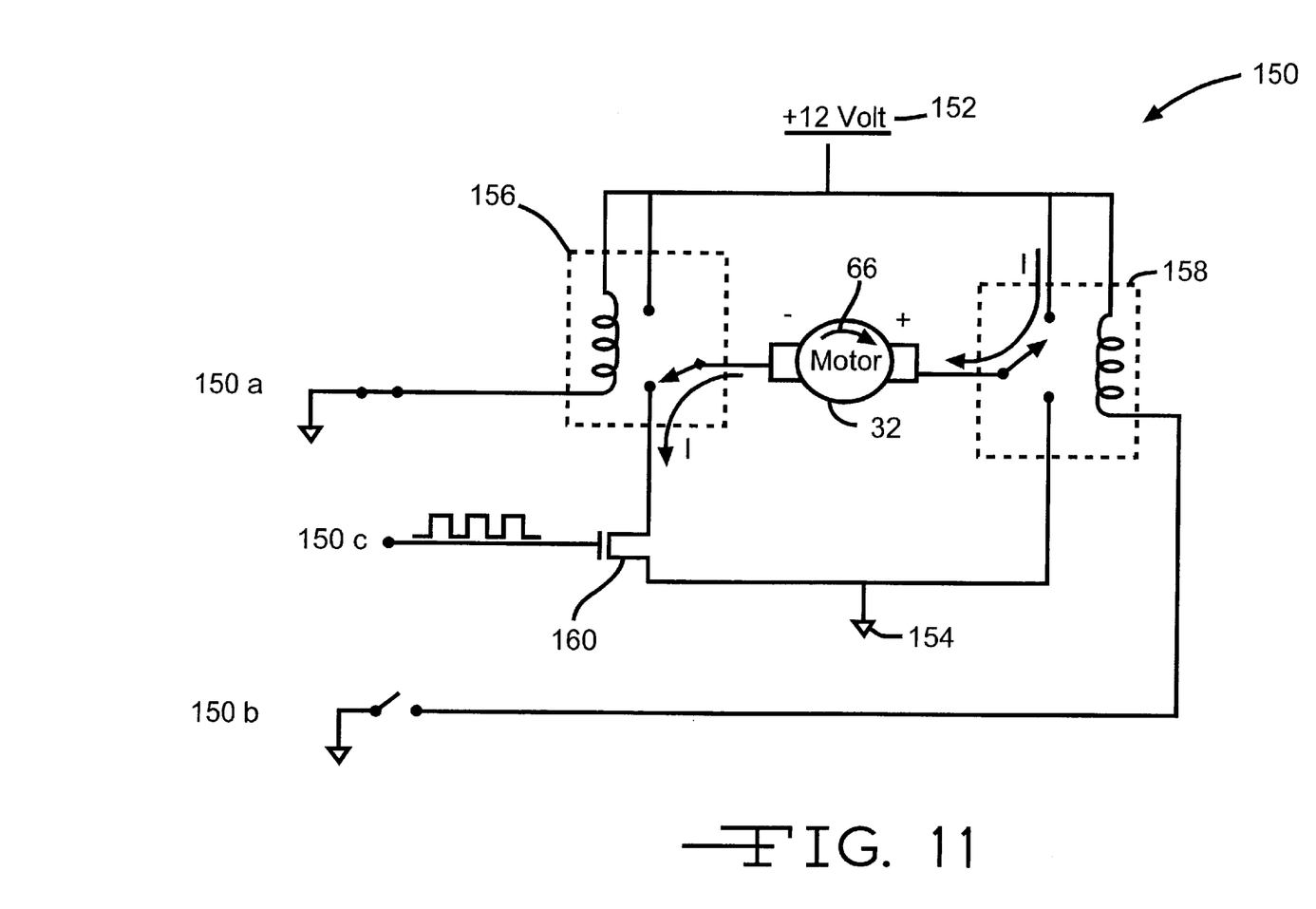
FIG. 11 is a schematic of the control circuit of FIG. 10 when energized to run the motor for gear selection.

As shown in FIG. 11, to actuate the motor 32 for gear selection (first rotational direction 66), the switch corresponding to Input 150a is closed, the switch corresponding to Input 150b is open, and a pulse width modulated signal is applied to Input 150c. The motor 32 rotates in a first rotational direction 66 which corresponds to turning the input shaft 50 for gear selection, as described above. The FET transistor 160 is preferably switched between a conducting state and non-conducting state by a pulse width modulated signal to provide a decrease in speed of the motor 32.

Figure 12:
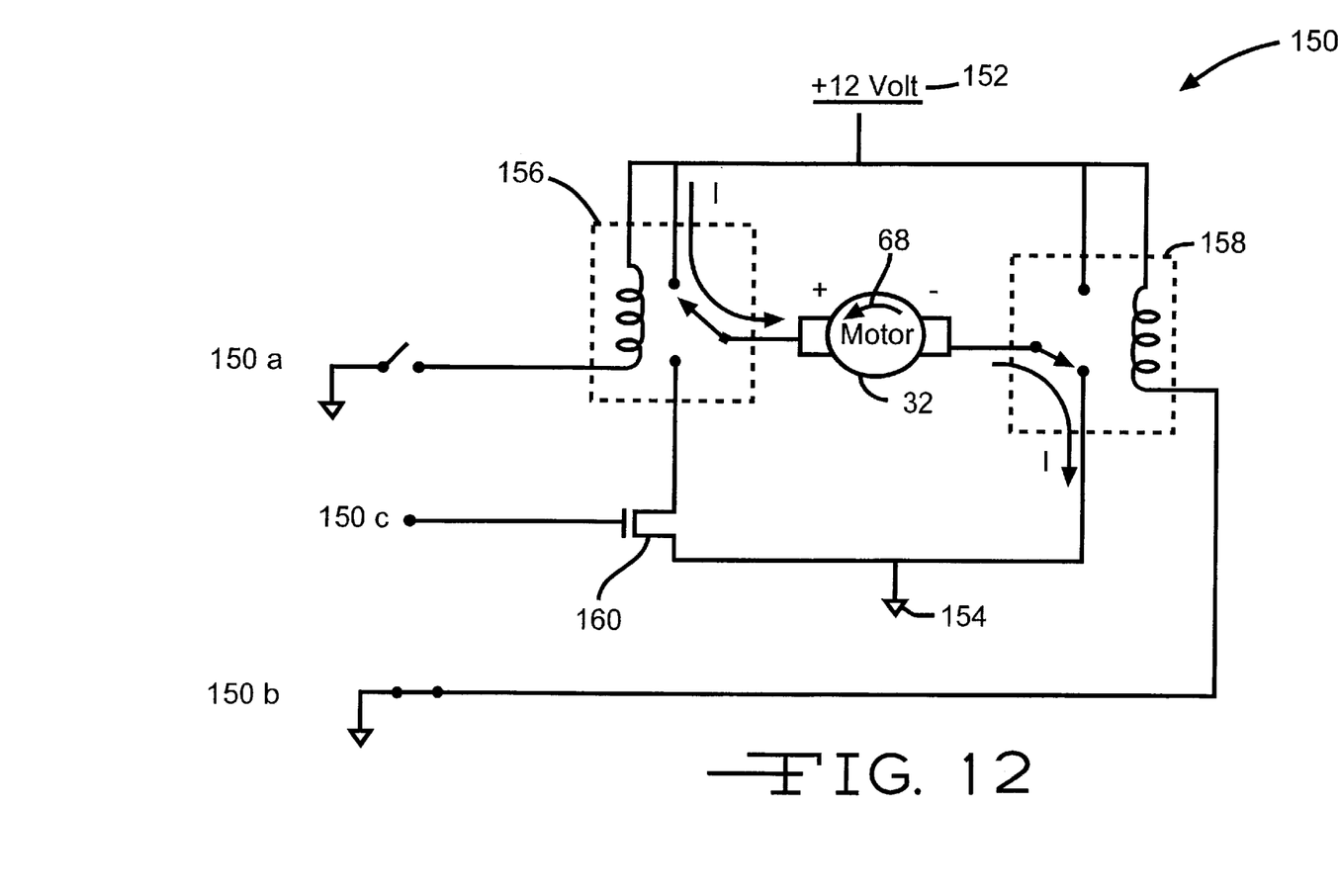
FIG. 12 is a schematic of the control circuit of FIG. 10 when energized to run the motor for operating the seat mechanism.

As shown in FIG. 12, to actuate the motor 32 for seat movement (second rotational direction 68), the switch corresponding to Input 150a is opened, the switch corresponding to the Input 150b is closed, and no signal is applied to Input 150c. The motor 32 rotates in a second rotational direction which corresponds to the turning the inner shafts, outer shafts, clutches, and pinion gears together for moving the associated seat mechanism.

Although the present invention was shown and described being associated with a vehicle seat, it should be understood that the invention can be practiced as any suitable drive mechanism having two or more transmission each being independently operated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat adjuster for a vehicle seat comprising:
    a single motor having an output shaft, said motor operable to rotate said shaft in first and second rotational directions;
    a transmission connected to said output shaft of said motor, said transmission having a driven shaft; and
    a seat mechanism connected to said driven shaft of said transmission;
    wherein rotation of said output shaft in said first rotational direction causes said transmission to select one of three operating modes for actuating said driven shaft, said three operating modes including a stationary mode wherein said driven shaft is not engaged to rotate, a first rotational mode wherein said driven shaft is engaged to rotate in a first rotational direction, and a second rotational mode wherein said driven shaft is engaged to rotate in said second rotational direction;
    and wherein rotation of said output shaft in said second rotational direction rotatably couples said rotation of said output shaft with said driven shaft to actuate said seat mechanism to move a portion of the seat.

2. The seat adjuster of claim 1 further including a controller for operating said motor to rotate at a slower speed in said first rotational direction than when rotating in said second direction.

3. The seat adjuster of claim 2, wherein said controller includes:
    a switching device connected to said motor; and
    a voltage supply device connected through said switching device to said motor, whereby said switching device modulates the voltage applied to said motor to control the speed of said motor.

4. The seat adjuster of claim 3, wherein said switching device is a field effect transistor.

5. The seat adjuster of claim 4, wherein said field effect transistor is switched between a conducting state and a non-conducting state by a pulse width modulated signal.

6. The seat adjuster of claim 1, wherein said transmission includes:
    first and second clutch plates spaced apart from one another;
    a clutch member disposed between said first and second clutch plates and mounted on said driven shaft, said clutch having a first wall engageable with said first clutch plate for rotational movement therewith, said clutch having a second wall engageable with said second clutch plate for rotational movement therewith, said clutch movable between first, second, and third positions between said first and second clutch members,
    wherein when said clutch is in said first position, said clutch is engaged with said first clutch plate;
    wherein when said clutch is in said second position, said clutch not engaged with either one of said first and second clutch plates; and
    wherein when said clutch is in said third position, said clutch is engaged with said second clutch plate.

7. The seat adjuster of claim 6, wherein said driven shaft is a driven shaft assembly including an outer shaft and an inner shaft rotatably coaxially disposed in said outer shaft, wherein said inner shaft includes a circumferential groove formed therein, said groove having a serpentine-like shaped profile that varies with respect to an axis defined by said inner shaft, and wherein said transmission further includes a pin slidably disposed in said groove and operatively engaged with said clutch member, wherein rotation of said inner shaft causes said pin to move axially within said groove, thereby moving said clutch member.

8. The seat adjuster of claim 7, wherein said pin is operatively engaged with said clutch member by said outer sleeve, wherein said outer sleeve is rotationally fixed relative to said clutch member, and wherein said pin is disposed in a slot formed through said outer sleeve such that rotational movement of said inner sleeve causes said pin to rotate said outer sleeve and said clutch member.

9. The seat adjuster of claim 6, wherein said clutch member includes a spring biased ramp member which engages with one of said clutch plates.

10. The seat adjuster of claim 1, wherein the seat mechanism moves the portion of the seat in one of a fore and aft direction relative to the vehicle.

11. The seat adjuster of claim 1, wherein the seat mechanism moves the portion of the seat in a vertical direction relative to the vehicle.

12. The seat adjuster of claim 1 including a plurality of transmissions connected to said output shaft of said transmission.

* * * * *